United States Patent
Hutter et al.

(10) Patent No.: US 9,234,752 B2
(45) Date of Patent: Jan. 12, 2016

(54) POSITIONING APPARATUS, IN PARTICULAR FOR ADJUSTING LENSES OR LENS SYSTEM IN OPTICAL DEVICES

(71) Applicant: Leica Geosystems AG, Heerbrugg (CH)

(72) Inventors: Pascal Hutter, Berneck (CH); Benjamin Seifert, Rebstein (CH); Josef Lais, Marbach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 56 days.

(21) Appl. No.: 14/295,172

(22) Filed: Jun. 3, 2014

(65) Prior Publication Data
US 2015/0022885 A1 Jan. 22, 2015

(30) Foreign Application Priority Data
Jun. 4, 2013 (EP) .................................. 13170541

(51) Int. Cl.
G02B 7/08 (2006.01)
G01C 15/00 (2006.01)
G02B 23/16 (2006.01)
G03B 3/10 (2006.01)

(52) U.S. Cl.
CPC ............... *G01C 15/002* (2013.01); *G02B 7/08* (2013.01); *G02B 23/16* (2013.01); *G03B 3/10* (2013.01)

(58) Field of Classification Search
CPC .... G01C 15/00; G01C 15/002; G01C 15/008; G01C 21/00; G01C 21/005; G01C 21/165; G01C 21/206; G01C 21/32; G01C 22/006; G01C 25/00
USPC .................................................. 33/290–292
See application file for complete search history.

(56) References Cited

U.S. PATENT DOCUMENTS

| | | | |
|---|---|---|---|
| 5,815,325 A | 9/1998 | Johnson | |
| 6,603,615 B2 * | 8/2003 | Melzer | G02B 7/1824 359/694 |
| 7,793,424 B2 | 9/2010 | Laabs et al. | |
| 8,363,324 B2 * | 1/2013 | Knoedgen | H04N 5/23212 359/619 |
| 2002/0106205 A1 | 8/2002 | Kikuchi et al. | |
| 2006/0215179 A1* | 9/2006 | McMurtry | G01B 11/272 356/622 |
| 2006/0285463 A1* | 12/2006 | Hashimoto | G11B 7/261 369/53.22 |

(Continued)

FOREIGN PATENT DOCUMENTS

| | | |
|---|---|---|
| DE | 197 10 722 A1 | 10/1997 |
| DE | 199 26 706 A1 | 12/1999 |

(Continued)

OTHER PUBLICATIONS

European Search Report dated Jan. 31, 2014 as received in Application No. EP 13 17 0541.

*Primary Examiner* — Yaritza Guadalupe-McCall
(74) *Attorney, Agent, or Firm* — Maschoff Brennan

(57) ABSTRACT

The invention relates to a positioning apparatus, comprising a rotatable spindle, a sliding member, wherein a spindle counter segment of the sliding member is displaced along the spindle when the spindle rotates, a first guide for the sliding member, which interacts with a first guide counter segment of the sliding member and, in the process, leaves the sliding member with a linear mobility along the first guide axis and a pivotability about the first guide axis, and a second guide for the sliding member, which interacts with a second guide counter segment of the sliding member and, in the process, restricts the pivotability of the sliding member about the first guide axis.

20 Claims, 13 Drawing Sheets

(56) References Cited

U.S. PATENT DOCUMENTS

| | | | |
|---|---|---|---|
| 2008/0136267 A1* | 6/2008 | Laabs | G01C 15/002 310/80 |
| 2009/0310145 A1* | 12/2009 | Sugiyama | G03F 7/70258 356/614 |
| 2011/0083334 A1* | 4/2011 | Eley | G01B 21/047 33/503 |
| 2011/0122516 A1 | 5/2011 | Jang | |
| 2015/0022885 A1* | 1/2015 | Hutter | G02B 7/08 359/426 |

FOREIGN PATENT DOCUMENTS

| | | |
|---|---|---|
| DE | 199 49 580 A1 | 4/2000 |
| DE | 101 60 587 A1 | 6/2013 |
| EP | 0 620 463 A1 | 10/1994 |
| EP | 1 081 459 A1 | 3/2001 |
| EP | 1 662 278 A1 | 5/2006 |
| EP | 1 686 350 A1 | 8/2006 |
| EP | 1 992 974 A2 | 11/2008 |
| JP | H11-295578 A | 10/1999 |

* cited by examiner

POSITIONING APPARATUS, IN PARTICULAR FOR ADJUSTING LENSES OR LENS SYSTEM IN OPTICAL DEVICES

FIELD OF THE INVENTION

The invention relates to a positioning apparatus, in particular a positioning apparatus for adjusting lenses or lens systems in optical devices.

Such a positioning apparatus for adjusting lenses or lens systems in optical devices can, for example, be embodied in a manner known per se with a motorized drive unit and a borne spindle, wherein, for the purposes of introducing the adjustment movement in the direction of the optical axis, a sliding member, which carries the optical unit to be adjusted and is guided linearly on guides, is in contact with the spindle by means of a spindle counter segment of the sliding member.

BACKGROUND

An application of a positioning apparatus in an optical instrument (such as a telescopic sight or other observation or image recording devices) for adjusting an optical unit, e.g. linearly along an optical axis of the instrument, requires the ability to position the optical unit in a repeatable and highly precise manner and without play such that an image of an object to be observed or to be recorded can be focused as precisely as possible and within the shortest amount of time possible prior to, or during, the observation/image recording.

In order to realize e.g. zoom movements or focus adjusting movements of individual lenses or lens groups in optical devices, use is increasingly made of electromotive direct drives instead of cam tubes or mechanical gearboxes. Since the installation space in an optical device is relatively small, the size of the adjustment unit is an important performance criterion. Therefore, it is possible to use e.g. small drive motors which, although they have low torque, nevertheless realize great accuracies (e.g. ±10 µm) at relatively fast displacement movements (e.g. 20 mm/s) in all spatial positions.

U.S. Pat. No. 5,815,325 describes a zoom drive for a camcorder, in which use is made of a stepper motor with small dimensions. Here, the motor shaft is embodied directly as threaded spindle so as to avoid constraining and axial forces, and borne at the one end thereof on an arm. Here, the arm is fastened directly to the motor housing.

In order to receive the rotational movement emanating from the threaded spindle and convert this movement into a translational displacement of an optical element, use is made of a form element provided with a threaded plate made of plastic. The threaded plate made of plastic acts in a resilient manner on the threaded spindle by means of a leaf spring, which is likewise a constituent of the form element. This form element is connected to the guided sliding member, which carries the optical element, by means of a rotational shaft such that there is an adjustment movement of the sliding member in the direction of the optical axis as a result of the rotational movement of the spindle.

DE 10 160 587 A1 has disclosed a further positioning apparatus of this type, for adjusting zoom lenses or zoom lens systems in optical devices.

The positioning apparatus, to which the invention relates, can specifically be designed to adjust a focusing optical unit in a telescopic sight of a geodetic surveying device.

A known example of such a geodetic surveying device includes a theodolite, a tachymeter or a total station, which is also referred to as electronic tachymeter or computer tachymeter. By way of example, such a geodetic measuring apparatus of the prior art is described in the publication EP 1 686 350. Such devices have electrical sensor-based angle and distance measurement functions, which allow a direction and distance to a selected target to be determined. In the process, the angle and distance variables are established in the internal reference system of the device and may optionally still have to be linked to an external reference system for determining an absolute position.

Modern total stations comprise microprocessors for digital processing and storing of registered measurement data. The devices are generally produced with a compact and integrated design, wherein usually coaxial distance and angle measurement elements and computer, control and storage units are integrated in a device. Depending on the development stage of the total station, means are integrated for motorizing the targeting optical unit, for reflector-less path measurement, for automated target search and tracking and for remote control of the whole device. Furthermore, total stations known from the prior art comprise at least one wireless data interface for establishing a wireless connection to external peripheral components such as e.g. a data registration device which, in particular, can be embodied as remote control, portable data logger, field computer, notebook, small computer or PDA. By means of the data interface, it is possible to output measurement data, which was registered and stored by the total station, for the purposes of external further processing, to read externally registered measurement data into the total station for the purposes of storage and/or further processing, to input or output remote control signals for remotely controlling the total station or a further external component, in particular in mobile field use, and to upload control software into the total station.

For sighting or targeting a target point to be surveyed, generic surveying devices have a targeting appliance (such as a telescopic sight/telescope). In a simple embodiment variant, the sighting appliance is embodied e.g. as a pure direct-vision telescopic sight. Moreover, modern devices can have a camera integrated into the telescopic sight, for registering an image, wherein the registered image can, in particular, be displayed as live image on a display of the total station and/or a display of the peripheral device—like a data logger—employed for the remote control. Here, the optical unit of the sighting appliance can have a manual focus—e.g. a set screw for changing the focus position of the optical unit or comprise an autofocus, wherein the focus position is changed e.g. by motors. However, a manually operable focus by all means can also be embodied in a motorized manner. Automatic focusing appliances for telescopic sights of geodetic devices are known from e.g. DE 19710722, DE 19926706 or DE 19949580.

The optical system or the optical visual channel of the targeting appliance (telescopic sight) in particular contains an objective lens group, a focusing lens group and an eyepiece, which are arranged in this sequence starting from the object side. The position of the focusing lens group is set dependent on the object distance in such a way that an in-focus object image is produced on an optical element, arranged in the focusing plane, with a targeting marking (in particular reticle or graticule, or else a plate with a crosshair marking and line markings). This optical element with the image produced in this plane can then be observed through the eyepiece.

The coaxial camera (e.g. with a CCD or CMOS area sensor) provided in addition to, or in place of a direct vision channel can be arranged in a further image plane provided in the telescopic sight optical unit, for which purpose provision can be made for decoupling a partial light beam by means of a beam splitter such that the camera can be used to record an image (or a series of images or a video stream) through the objective.

Furthermore, an additional, separate transmission and reception channel branch can be provided for the coaxial electronic distance measurement. Moreover, conventional surveying devices have in the meantime been equipped with an automatic target recognition (ATR) function, for the purposes of which a further, separate ATR light source e.g. a multi-mode fiber output, which emits light at a further defined wavelength and a special ATR camera sensor are additionally integrated into the telescope.

In order to avoid distortions, color distortions or vignetting—i.e. a drop in brightness in edge regions of the observable visual field—very high demands are placed on the individual optical components. Accordingly, optical units coated in a specific and complicated manner are generally required for decoupling and coupling individual wavelengths, wherein the visual band should allow a representation with the highest possible color fidelity despite the coating.

The design of generic telescopic sights of geodetic devices is shown in the publications EP 1 081 459 or EP 1 662 278 in an exemplary manner.

The accuracy obtainable for surveying when targeting objects—through the telescopic sight via direct vision—depends strongly on the precision of the positioning and adjustment of the optical units installed in the telescopic sight. Movable optical units in particular (as represented by the focusing optical unit in such telescopic sights) can constitute a substantial factor for the accuracy that can be achieved with such surveying devices since any radial deflection of such a movable optical unit on the displacement path, which should in fact be as axial as possible, along the intended optical axis causes a change in the actual optical axis defined by the overall optical system. Since the intended optical axis then may no longer correspond sufficiently to the actual optical axis, the intended optical axis may in fact point past the target object—despite apparently "correct" sighting of the target object—such that incorrect solid angles are possibly read out for the target object.

By way of example, U.S. Pat. No. 7,793,424 has disclosed such a positioning apparatuses for adjusting focus lenses of focus lens systems in a telescopic sight of a geodetic surveying system.

Here, a sliding member carrying the focusing optical unit is guided by means of a first and second guide (namely a rod and a sliding surface) such that the mobility of the sliding member is, firstly, restricted by the rod to a linear mobility along the first guide axis and a pivotability about the first guide axis and, moreover, a stop for the pivotability is given by the sliding surface.

Here, a roller of the sliding member running on the sliding surface is pressed onto the sliding surface by a magnet apparatus or the magnet apparatus ensures that the roller is pressed against the sliding surface and kept in a pressed-on and contacting state.

To ensure displaceability of the sliding member, provision is made for a rotatable threaded spindle, which is driven by a motor (the driveshaft of which is connected to the spindle via a flexible coupling). A pickup with a counter thread is displaced in a translational manner on the spindle when the spindle performs rotational movement. Here, the pickup is connected to the sliding member in a special manner, namely by means of an elastic connection element which causes a torque tilting the pickup in relation to the spindle.

This arrangement is intended to ensure that there is as little play as possible (at least at special contact points of action) between the counter thread and the thread of the spindle and it is thereby intended to be able to reduce or avoid hysteresis in the translational movement of the pickup and of the sliding member when there is a change in direction of the rotational movement of the spindle. By way of example, disadvantages of this arrangement include the fixed tension of pickup and spindle, ensured by the torque acting on the pickup, and so—if the sliding member is already situated at a mechanical stop present for restricting the displacement path, and the spindle is nevertheless rotated further in the correspondingly wrong direction—there may be an irreversible mechanical defect on the spindle thread, on the counter thread of the pickup, on the adjustment path stop and/or on the guides.

A further disadvantage also lies in the complex complicated design and the required large number of components—each of which only ensuring precisely one single special function—of the positioning apparatus.

Furthermore, adjusting the focusing optical unit (i.e. that is to say aligning the focusing optical unit in such a way that the principal point of the optical unit sits precisely at the intended position thereof in the telescopic sight and moves precisely along the intended axis of the telescopic sight) within the telescopic sight is complicated in the positioning apparatus described in U.S. Pat. No. 7,793,424.

SUMMARY

Some embodiments of the invention improve a positioning apparatus—in particular for a focusing optical member of a telescopic sight of a geodetic surveying device—and, specifically, to reduce or entirely eliminate in the process the disadvantages described above.

Specifically, it is thus intended that the positioning apparatus is to be realizable with a less complex and less complicated design, the sliding member is to be adjustable in an improved and less complicated manner (in particular in relation to the radial precise positionability of the sliding member in cooperation with first and second guide) and protected against internal self damage—e.g. despite an occurring malfunction of the motor—in an improved manner.

In general, the positioning apparatus, to which the invention relates, is embodied with a rotatable spindle and a sliding member to be positioned along a positioning axis, wherein a spindle counter segment of the sliding member and the spindle are embodied, arranged relative to one another and cooperatively matched to one another in such a way that the spindle counter segment is displaced along the spindle when the spindle rotates. Here, a principal point (such as a center point of a lens or lens group carried by the sliding member) can be defined for the sliding member, with the object primarily being to displace said principal point along the positioning axis in a highly precise manner.

Furthermore, provision is made for a first guide, defining a first guide axis extending parallel to the positioning axis, for the sliding member. Here, the first guide and a first guide counter segment of the sliding member are embodied, arranged relative to one another and cooperatively matched to one another in such a way that the sliding member is guided along the first guide axis and a linear mobility along the first guide axis and a pivotability about the first guide axis remain for the sliding member.

Moreover, provision is made for a second guide for the sliding member, comprising a second guide element extending parallel to the positioning axis. The second guide element and a second guide counter segment of the sliding member are embodied, arranged relative to one another and cooperatively matched to one another in such a way that—in particular if a contact force, against the second guide element, acting on the second guide counter segment is present—the second guide counter segment is guided along the second guide element and the pivotability of the sliding member about the first guide axis is restricted. The second guide element thus serves as a stop for the pivotability, still granted by the first guide, of the sliding member and as a second guide at a second position (namely at the second guide counter segment) of the sliding member. In particular, the second guide element can be embodied in cooperation with the second guide counter segment in such a way that the second guide counter segment is guided along the second guide element along a second longitudinal guide axis, extending parallel to the positioning axis, and along a second transverse guide axis, extending perpendicular thereto, such that a mobility along the second longitudinal guide axis and an (at least certain) mobility (freedom for movement/deviation) in the direction of the second transverse guide axis therefore remain for the sliding member.

According to a first main aspect according to the invention, provision is now made for a clamping element embodied and arranged in such a way and causing such a force that, thereby, the sliding member—in respect of the pivotability thereof about the first guide axis, granted by the first guide—is respectively clamped between the spindle and the second guide element with the spindle counter segment thereof and the second guide counter segment thereof such that, on the basis of the force caused by the clamping element, firstly, both the spindle counter segment and the spindle and, secondly, the second guide counter segment and the second guide element are respectively pressed against one another together with pivot anchoring of the sliding member caused by the first guide.

Hence, according to this first main aspect of the invention, the same clamping element, which ensures that the spindle counter segment and the spindle are pressed against one another and therefore kept in a state in which there is functional contact, is also used simultaneously with dual functionality (and using the first guide as pivot anchor) for the purpose of pressing the second guide counter segment and the second guide element against one another and therefore keeping these in a state in which there is functional contact.

This advantageously resolves in an inventive manner the requirement, previously considered indispensable in the prior art as per the teaching of U.S. Pat. No. 7,793,424, for a separate means (such as a separate magnetic pressing apparatus) for pressing the roller (as second guide counter segment) against the sliding surface (as second guide element).

Therefore, according to the invention, a less complex and less complicated design—in particular also in relation to the required number of components of the positioning apparatus—is made possible.

Here, for example, the clamping element can be embodied as spring element.

Here, within the scope of the invention, the spindle counter segment can be embodied with open, in particular one sided spindle engagement and can cooperate with the spindle and the clamping element in such a way that, in the clamped state of the sliding member, firstly, the spindle counter segment and the spindle—due to the contact force—form an interlocking connection substantially without play (i.e. that in each case a normal force—action and reaction acts as mutual contact force on the spindle counter segment and the spindle) and secondly—as a result of flexibly bearing the spindle counter segment or the spindle—a freedom of movement for the spindle counter segment or the spindle is granted counter to the contact force for detaching the connection (i.e. for the spindle counter segment for the purposes of removal from the spindle and/or for the spindle for the purposes of removal from the spindle counter segment).

This can now provide the positioning apparatus with improved protection against internal self damage—e.g. despite an occurring malfunction of the motor. Thus, for example, in the case where the sliding member is already situated at a mechanical stop present for restricting the displacement path, and the spindle is nevertheless rotated further in the correspondingly wrong direction, the spindle counter segment can now be released against the contact force from the interlocking functional connection with the spindle and an irreversible mechanical defect on the spindle, the spindle counter segment, on the adjustment path stop and/or on the guides can be avoided.

By way of example, specifically, the spindle counter segment can be flexibly borne relative to a main body of the sliding member (which main body has the first and second guide counter segments positioned fixedly relative to one another and for which a principal point, which is to be displaced very precisely along a positioning axis, is defined) and/or the spindle can be flexibly borne relative to a framework (carrying at least the first and second guide)

such that an enabled mobility relative to one another is ensured in at least one further degree of freedom (naturally in addition to the envisaged rotation of the spindle and the translational movement of the spindle counter segment along the spindle) between spindle counter segment and spindle, which mobility, at least to a small extent, renders it possible to bring together the spindle counter segment and the spindle (such that these contact one another) or to bring these apart (such that these are at least slightly removed from one another).

In a first alternative for the mutual mobility of spindle counter segment and spindle relative to one another, which is to be ensured, the spindle counter segment can be flexibly borne relative to the main body of the sliding member by means of the clamping element and the clamping element can connect the spindle counter segment and the main body in such a way that a spreading force acts on the spindle counter segment relative to the main body in the pre-tensioned state of the clamping element.

By way of example, in the process, the clamping element, which bears (or flexibly elastically connects) the spindle counter segment and the main body on (to) one another, can be embodied to be flexible in at least one degree of freedom in a plane perpendicular to the spindle axis and rigid, at least in the direction of the positioning axis. In particular, the clamping element can be embodied—fixedly connected to the main body at one end and fixedly connected to the spindle counter segment at the other end—as leaf spring, which with the flat sides thereof is arranged parallel to the spindle axis and positioning axis.

This then ensures the flexibility in respect of removability of the spindle counter segment from the spindle and, moreover, a uniform contact pressure of the spindle counter segment on the spindle over the whole mutual contact area thereof.

Specifically, the leaf spring can have an elongate form and, with the longitudinal axis thereof, be aligned perpendicular to the spindle axis such that, moreover, a certain amount of flexibility in respect of a tiltability of the spindle counter segment with respect to the spindle is ensured.

For that reason, together with the uniform contact pressure, this then enables the spindle counter segment, in the clamped state, nevertheless to be pressed uniformly on the spindle over the whole mutual contact region/contact line and, as a result of the contact force, the spindle counter segment to be brought and thus kept in an interlocking functional connection with substantially no play with the spindle, even in the case of inaccuracies—actually present in a relaxed state of the leaf spring in the positioning of spindle counter segment and spindle (e.g. slight tilt position with respect to one another).

Thus, this can therefore e.g. provide the clamped state of the sliding member, with the spindle counter segment thereof and the second guide counter segment thereof between the spindle and the second guide element.

However, alternatively or additionally, the spindle can also be flexibly borne relative to the framework in a transverse direction perpendicular to the spindle axis and the clamping element can be embodied and arranged in such a way that, in the pre-tensioned state of the clamping element, a translational force acts on the spindle in this transverse direction. Then, this (i.e. even in an embodiment with rigid arrangement/attachment of the spindle counter segment on the main body of the sliding member) can also provide the clamped state of the sliding member, with the spindle counter segment thereof and the second guide counter segment thereof between the pressing spindle and the second guide element.

In a development of the first main aspect according to the invention, it is furthermore possible, as a result of the first guide serving as anchor for the sliding member in the clamped state of the sliding member, for a first bearing, bearing the first guide and the first guide counter segment relative to one another, to be pre-tensioned by the force caused by the clamping element (as it were, in a third simultaneous function of the same clamping element). In particular this can press the first guide counter segment into a defined position relative to the first guide.

According to a second main aspect according to the invention, the sliding member, with the first and second guide counter segment thereof, and the first and second guide are arranged relative to one another and matched to one another in such a way that—as observed in a cross-sectional plane aligned perpendicular to the positioning axis
- an x-direction, which points from the principal point of the sliding member, which is primarily to be positioned precisely, to the intersection point of the second longitudinal guide axis of the second guide and the cross-sectional plane, and
- a y-direction, which points from this principal point to the intersection point of the first guide axis and the cross-sectional plane, include an angle of between 60 and 120 degrees, in particular at least approximately a right angle, such that
- the second guide is decisive for an x-travel—substantially uninfluenced by the first guide—of a track of the principal point actually traveled during the displacement of the sliding member, as observed in the x-direction, and
- the first guide is decisive for a y-travel—substantially uninfluenced by the second guide—of said track of the principal point, as observed in the y-direction.

According to the invention, this can bring about a separation when adjusting the sliding member (or when positioning the first and second guide, which is relevant to positioning the sliding member) into separate adjustment steps/processes for, firstly, the positioning of the principal point of the sliding member once in the x-direction and, secondly, the positioning of the principal point of the sliding member in the y-direction.

As a result, "mispositioning" of the first guide in the x-direction and of the second guide in the y direction has a significantly smaller impact on an incorrect positioning or a track error of the principal point than in the case of an arrangement in which the x-position and y-position of at least one of the two, or even both, guides is relevant to the intended position/intended track of the principal point which is to be maintained precisely.

Here, the mutual influence of the positioning of the first and second guide with respect to the position/track of the principal point, resulting therefrom, in the x-direction and y-direction has a sinusoidal dependence about a manner of arrangement with a right angle between the x-direction and y-direction.

In a manner of arrangement with a right angle between the x-direction and y-direction, the mutual influence of the guides on the x-position and y-position of the principal point along the track is minimal in this case (i.e. at the apex of a sine curve). Furthermore, the mutual influence only increases slowly even in the case of deviations from the right angle (since the sine curve is very flat around the apex).

Therefore, even deviations of e.g. up to approximately ±30° from the right angle can still, within the meaning of the invention, lead to a sufficient reduction in the (undesirable) influence of the first guide on the x-position and of the second guide on the y-position of the principal point or the track of the principal point.

However, a better separation or independence of the first and second guide from one another (in relation to the resultant x-travel and y-travel of the track of the principal point) can be effected if a deviation of at most approximately ±15° from the right angle, specifically of at most approximately ±10°, is maintained.

In addition to the angle between x-direction and y-direction, the length of the "y-lever" between the principal point and the first guide axis (and—in the case of the deviation from the right angle—a ratio of the length of the "y-lever" relative to the length of the "x-lever" between principal point and the second longitudinal guide axis) also still plays a role, in particular with respect to the independence of the second guide from the first guide (i.e. in relation to the desired prescription, which is as exclusive as possible, of the x-travel of the track of the principal point by means of the second guide—i.e. as independently as possible from the first guide). Thus, what applies in general is that with increasing length of the "y-lever", the second guide becomes ever more independent from the first guide—in relation to the desired prescription, which is as exclusive as possible, of the x-travel of the track of the principal point by means of the second guide.

Therefore, this arrangement according to the invention advantageously simplifies an adjustment procedure of the positioning apparatus within an optical instrument and therefore possibly also simplifies the achievable positioning accuracy (accuracy of maintaining the intended track) of the principal point along the positioning axis.

Although the two main aspects according to the invention can advantageously be combined together in one embodiment in this case, resulting in synergistic effects, said main aspects also can be implemented in each case only individually for bringing about the respectively mentioned advantages.

The following general developments according to the invention can be applied to embodiments in accordance with the first and/or the second main aspect of the invention:

Here, the first guide can have a first guide element, in particular embodied as guide rod, and provision can be made for a first bearing (which can however—in particular when embodied as a plain bearing—also be formed directly by the first guide element and first guide counter segment), bearing the first guide element and the first guide counter segment relative to one another.

Thus, specifically, the bearing can be embodied as
plain bearing, specifically
as V- or U-bearing with sliding surfaces or sliding edges, in particular made of bronze or sliding-optimized plastic, arranged on the first guide counter segment, or
as sleeve bearing with a round bushing, in particular made of bronze or sliding-optimized plastic, arranged on the first guide counter segment,
ball bearing or
rolling-element bearing, in particular with two axes.

In respect of the cooperation between the second guide element and the second guide counter segment, it may be essential (in particular within the scope of the second main aspect of the invention) for the second guide counter segment to be guided along the second guide element along a second longitudinal guide axis, extending parallel to the positioning axis, and along a second transverse guide axis, extending perpendicular thereto and pointing in the y-direction, such that a mobility along the second longitudinal guide axis and an (at least certain) mobility (freedom for movement/deviation) in the y-direction therefore remain for the sliding member. By way of example, this can be effected by virtue of the fact that the second guide element is embodied as flat sliding surface, in particular as a ceramic plate. The longitudinal axis of the sliding surface should then be aligned parallel to the positioning axis such that the second longitudinal guide axis is defined thereby, and a transverse axis of the sliding surface should be aligned in the y-direction such that the second transverse guide axis is defined thereby.

This (i.e. the "areal" guidance on the second guide—i.e. that is to say with an unchanging guide over a certain y-direction range in relation to the x-positioning of the principal point caused by the second guide) allows only the y-positioning of the principal point to be initially undertaken during an adjustment procedure (by means of an appropriate adaptation of the y-positioning of the first guide, that is to say e.g. the first guide rod), since the second guide can then remain unaffected thereby.

However, alternatively, this can also be caused by a differently embodied second guide, for example if the second guide element is embodied as a rod and the second guide counter segment is embodied as straight circular cylindrical roller with straight/flat extent (i.e. relating to the width of the roller or the "height" of the cylinder) in the y direction (which then in turn ensures unchanging guidance in the direction of the second longitudinal guide axis over a certain variable y-direction range).

Depending on the embodiment of the second guide element, the second guide counter segment can advantageously be embodied as or have
a roller,
a ball bearing,
one or more pin elements as sliding element,
one or more ball elements as sliding element or
a surface, specifically made of sliding-optimized plastic, as sliding element.

By way of example, the spindle can be embodied as threaded spindle and the spindle counter segment can be embodied as rake (or else referred to as a comb-like structure, for example with a multiplicity of teeth/cogs, or else optionally with only a few teeth/cogs, or even with only one tooth/cog).

Furthermore, the positioning device can be embodied with a motor with a driveshaft, a coupling for connecting the driveshaft to the spindle, in particular wherein the coupling is embodied as a claw coupling with an elastic intermediate disk, and/or a framework carrying at least the first and second guide, the motor and the spindle.

A further subject matter of the invention relates to an optical instrument with a positioning apparatus in one of the above-described embodiments, wherein the sliding member carries a focusing optical unit, in particular a focus lens system or a focus lens, such that a principal point of the focusing optical unit can be displaced along an intended optical axis of the optical instrument as positioning axis and a focus can thereby be set.

Specifically, the optical instrument can be embodied as telescope, in particular for use in a geodetic surveying device.

The method according to the invention and the apparatus according to the invention will be described in more detail below in a purely exemplary manner on the basis of specific exemplary embodiments that are schematically depicted in the drawings, with further advantages of the invention also being discussed.

DETAILED DESCRIPTION

Figure 1:
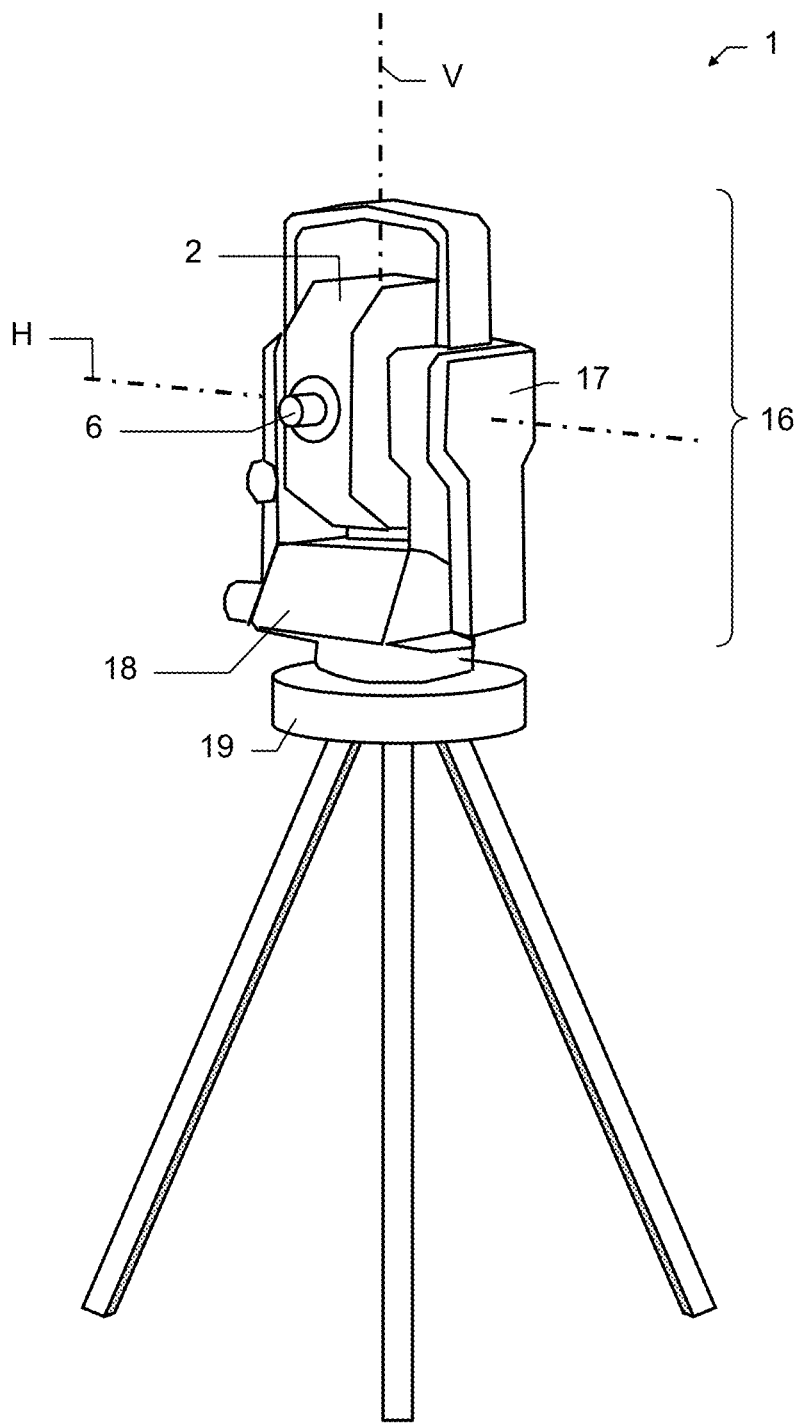
FIG. 1 shows a geodetic surveying device according to some embodiments described herein.
Figure 5:
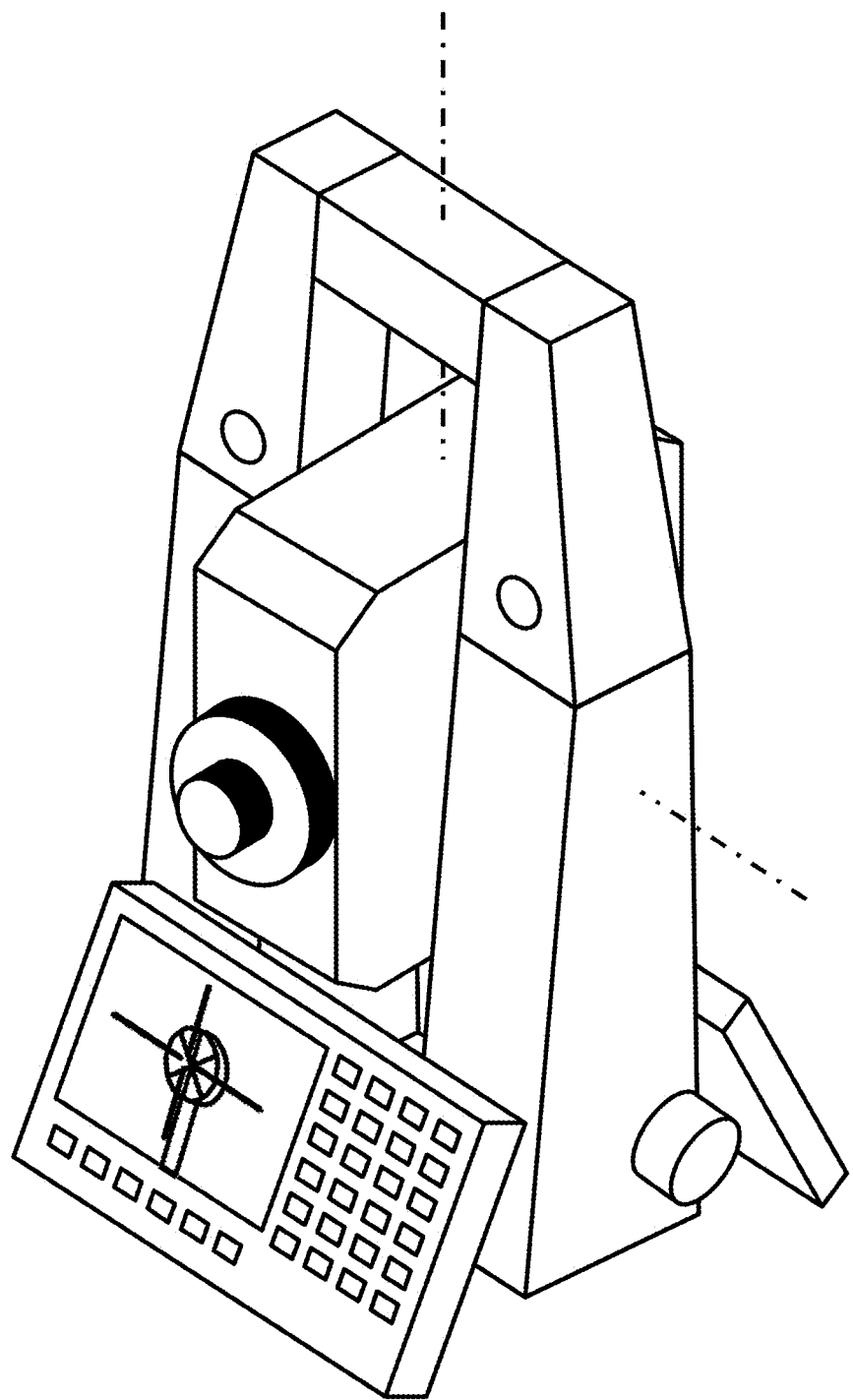
FIG. 5 shows a geodetic surveying device according to some embodiments described herein.

FIGS. 1 and 5 show an inventive geodetic surveying device 1, embodied as total station, for measuring horizontal angles, vertical angles (corresponding to pivoted positions of the support and the targeting unit) and distances to a spaced-apart and sighted target.

As shown in FIG. 1, the total station can be arranged on a stand, wherein a base 19 of the total station is directly and securely connected to the stand. The main body of the total station, which is also referred to as upper part 16, is rotatable relative to the base 19 about a vertical axis V.

Here, the upper part 16 has a support 17—e.g. formed by two columns, a sighting appliance 2 rotatably borne between the columns about the horizontal tilt axis H, and an electronic data processing and display module 18, which is formed by a control and evaluation unit and a display. The electronic data processing and display module 18 can be embodied in a manner known per se for controlling the surveying device 1 and for processing, displaying and storing measurement data (alternatively, other placements of e.g. the data processing module are also realizable [i.e. outside of the display module 18], such as e.g. integrated directly into the base 19 or even completely outside of the body of the surveying device depicted here).

The targeting unit or sighting appliance 2 is arranged on the support 17, rotatable about a horizontal tilt axis H, and can therefore be pivoted or tilted horizontally and vertically relative to the base 19 for alignment to a target object. Here, the sighting appliance is embodied as a common sighting appliance component, wherein at least one objective, a focusing optical unit, a coaxial camera sensor, an optical targeting graticule and the eyepiece 6 are arranged in or on a common sighting appliance housing.

By means of the sighting appliance 2, it is possible to target a target object and register the distance between the total station and the target object in an electric sensor-based manner. Furthermore, means are provided on an electric sensor-based basis for registering the angle alignment of the upper part 16 relative to the base 19 and of the sighting appliance 2 relative to the support 17. These measurement data, registered by electric sensor-based principles, are fed to the control and evaluation unit and processed by the latter such that the position of the target point relative to the total station can be established, graphically displayed and stored by the data processing and display module 18.

Figure 2:
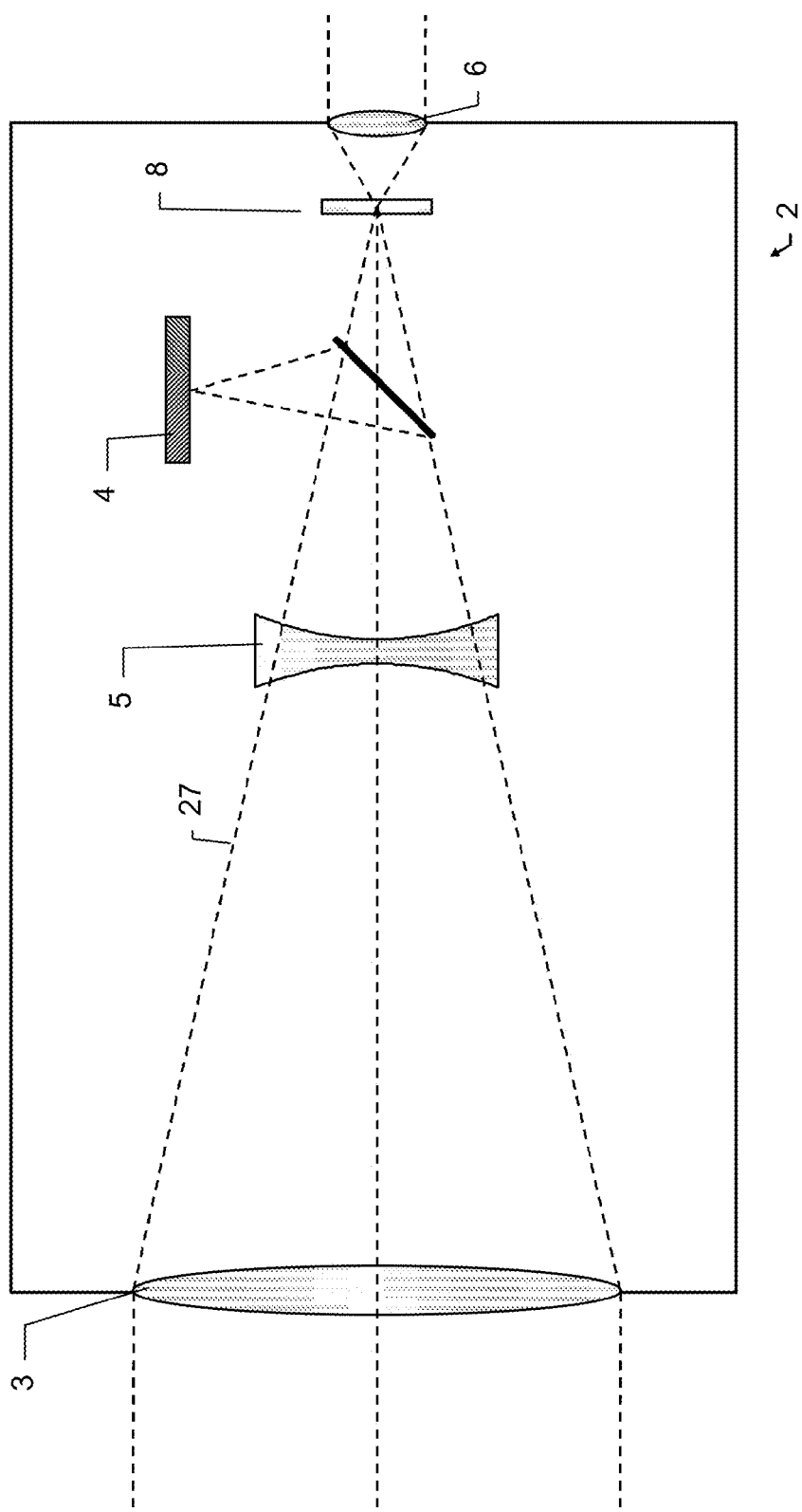
FIG. 2 shows an embodiments of a targeting unit with a telescope optical unit according to some embodiments described herein.
Figure 3:
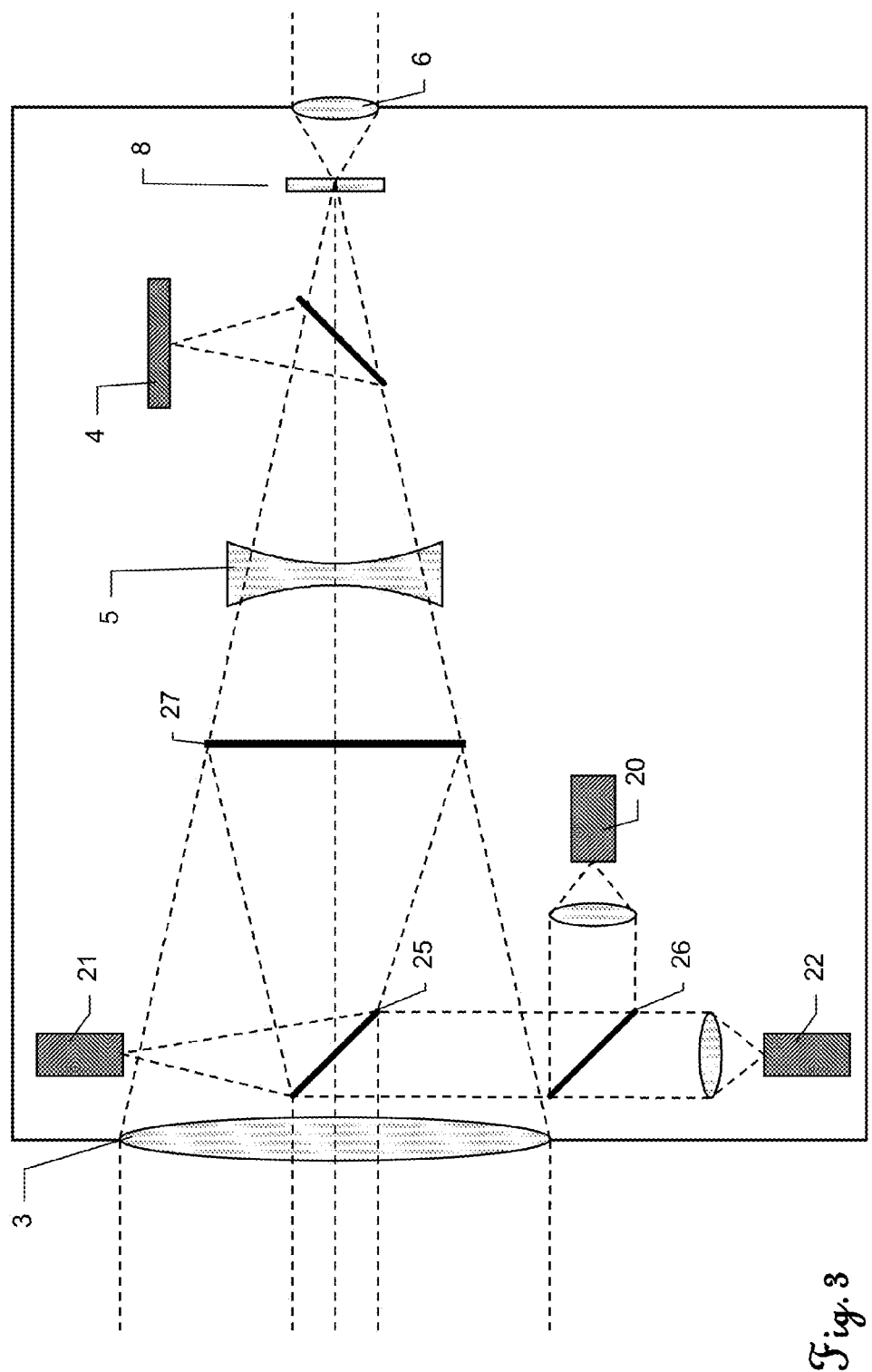
FIG. 3 shows an embodiments of a targeting unit with a telescope optical unit according to some embodiments described herein.
Figure 4:
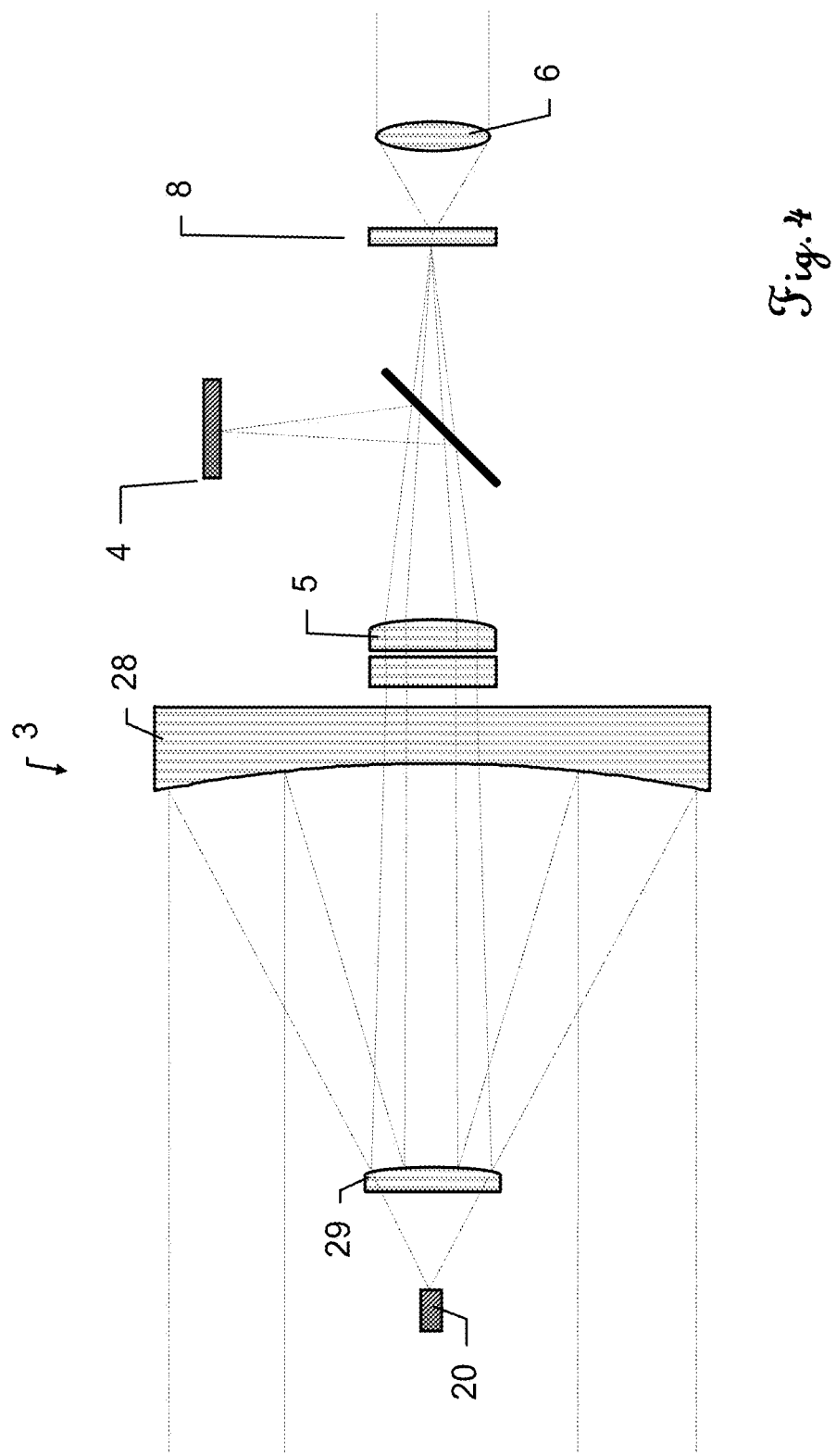
FIG. 4 shows an embodiments of a targeting unit with a telescope optical unit according to some embodiments described herein.

FIGS. 2, 3 and 4 schematically show possible embodiments of the targeting unit with a telescope optical unit, as are also already sufficiently well known from the prior art.

Here, FIG. 2 shows a simplified form of the embodiment shown in FIG. 3. Here, FIG. 3 shows a refractive embodiment for a sighting appliance optical unit according to the invention.

The sighting appliance optical unit has the objective 3, the focusing optical unit 5, a camera sensor 4 aligned coaxially with the optical axis of the sighting appliance 2 for registering a camera image, a graticule 8 and an eyepiece 6.

Here, the camera sensor 4 is connected to an electronic graphics processing unit for generating a display image from the registered camera image. The graphics processing unit is in turn connected to the display such that the generated display image can be depicted by means of the display.

The objective 3 can e.g. also have a multi-lens design or be embodied to be panfocal—i.e. have a changeable field of view.

For the distance measurement and the automatic target search function, provision is made for an EDM laser source 20 or a fine-targeting light source 22, wherein the EDM laser beams or the fine-targeting beams are appropriately coupled and decoupled using a first and second beam combiner 25, 26—such as e.g. beam splitter faces with a dichroic coating.

By way of example, the EDM laser source 20 can emit EDM laser beams in the visual range—for example with a wavelength of 630 nm—such that a measurement spot is visible on the target object.

Here, a beam decoupler 27, which decouples the EDM laser beams but advantageously transmits the visual spectrum with as little impairment as possible, can be present between the first beam combiner 25 and the focusing optical unit 5. The decoupled EDM laser beams are directed to an EDM receiver 21 by the beam combiner 25.

The focusing element 5, the position of which can change, can alternatively also have a multi-lens design. Advantageously, the focusing element 5 has a stable, precisely reproducible position for objects at infinity (and for other focus positions) such that it is possible to ensure an achievable accuracy that is as good as possible during the automatic fine-targeting.

FIG. 4 shows a further embodiment for a sighting appliance optical unit according to the invention. In this case, the sighting appliance is embodied as catadioptric system with a mirror optical unit. Here, a first, concave mirror 28 serves as objective 3.

A second, smaller mirror 29 is embodied to be transmissive to EDM laser beams such that the EDM laser beams emitted using the EDM laser source 20 are transmitted through the second mirror 29, for the distance measurement.

An image of the visual field range is focused on the camera sensor 4 using the multi-lens focusing optical unit 5 and registered as camera image. Moreover, an intermediate image which can be observed by a user through the eyepiece 6 is also produced in the plane of the graticule 8.

The accuracy that can be obtained for surveying when targeting objects—occurring by such targeting units by a direct vision—depends strongly on the precision of the positioning and adjustment of the optical units installed in the telescopic sight. The movable focusing optical unit in particular constitutes a substantial factor for the accuracy that can be achieved with such surveying devices since each radial deflection of such a movable optical unit along the displacement path, which should in actual fact be as axial as possible, along the intended optical axis causes a change in the effective actual optical axis defined by the overall optical system. Since it may then be the case that the intended optical axis no longer corresponds to the actual optical axis, the intended optical axis may in fact point past the target object—despite apparently "correct" sighting of the target object—such that incorrect solid angles are possibly read out for the target object.

Figure 6:
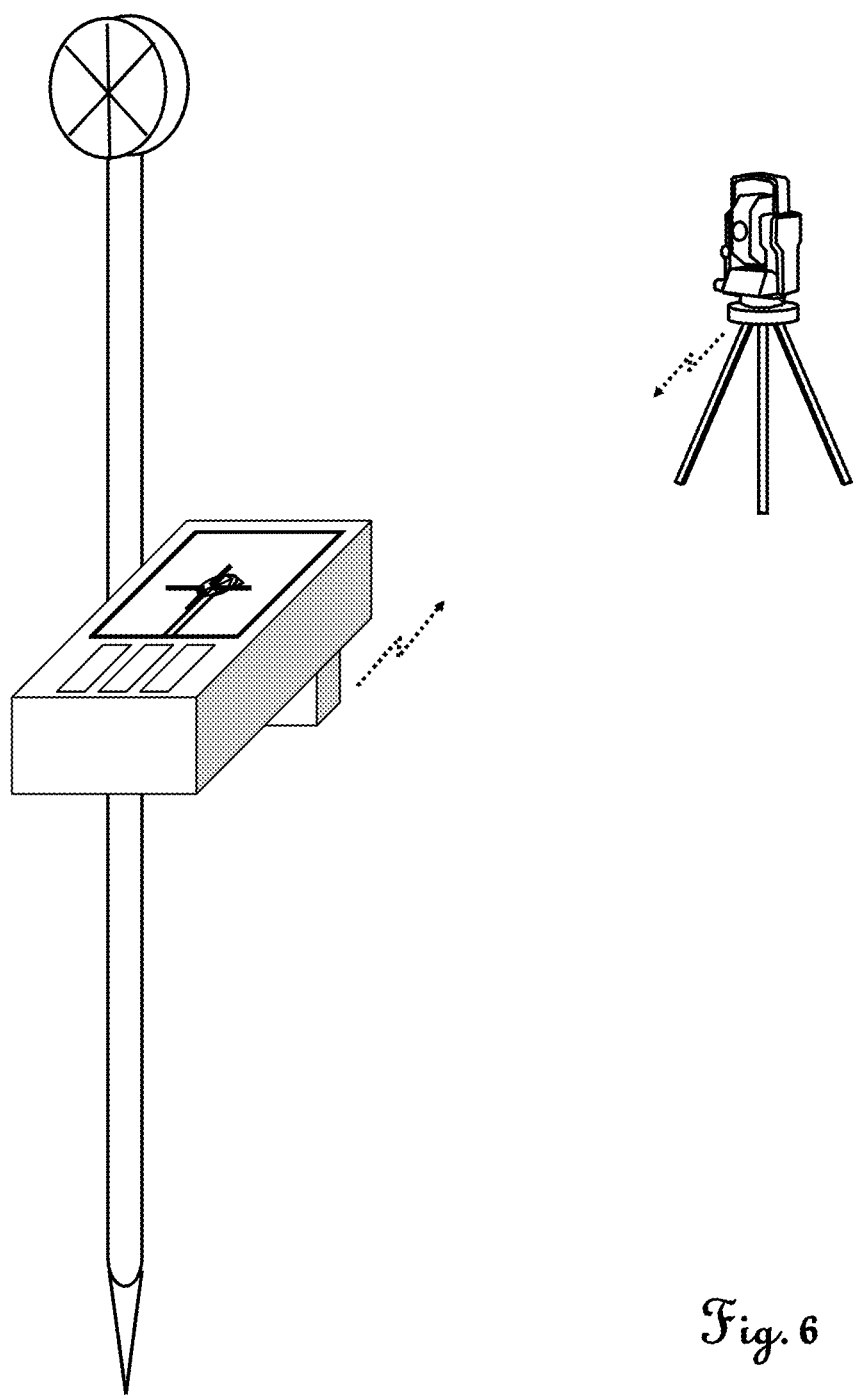
FIG. 6 shows a peripheral remote control unit according to some embodiments described herein.
Figure 7A:
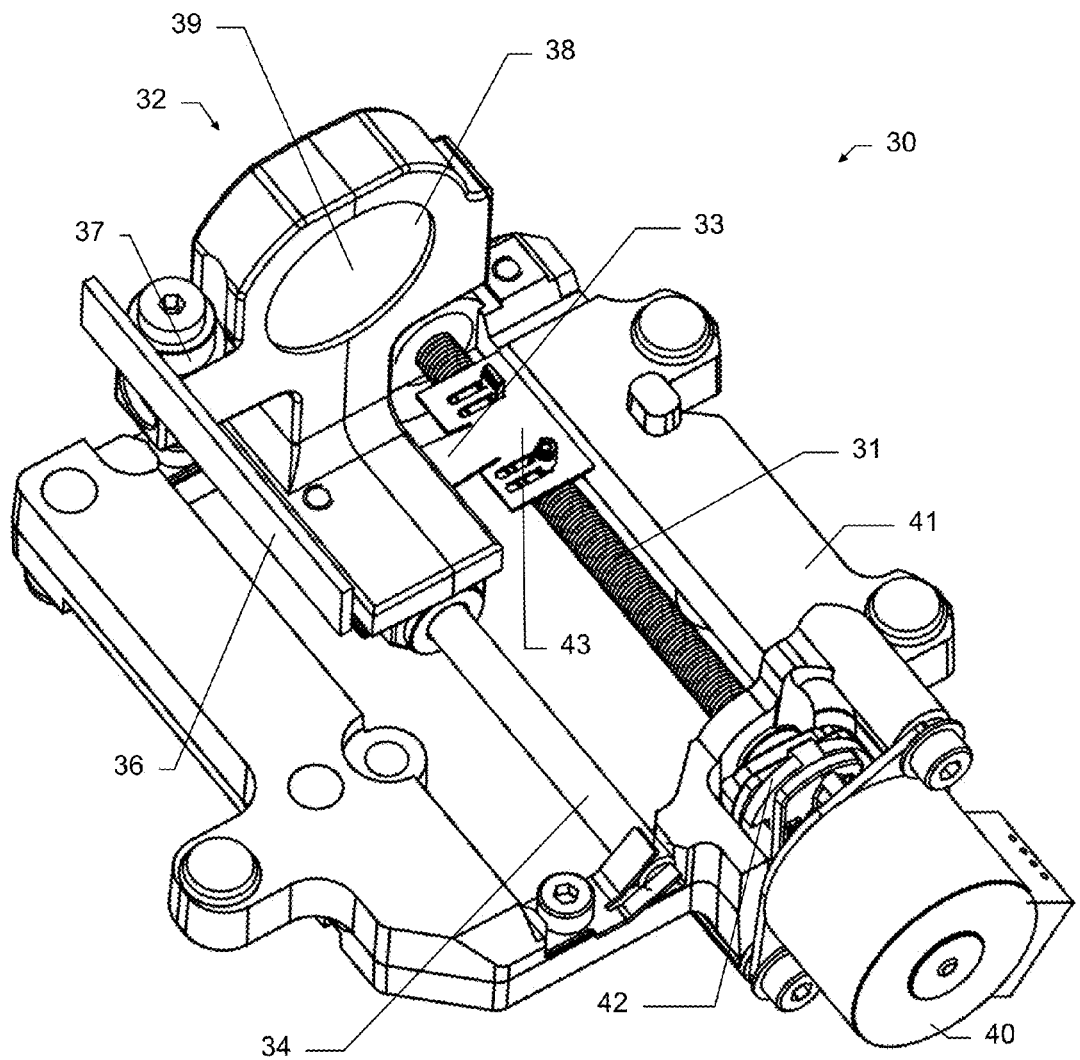
FIGS. 7a to 7e show embodiments of a positioning apparatus according to some embodiments described herein.
Figure 7B:
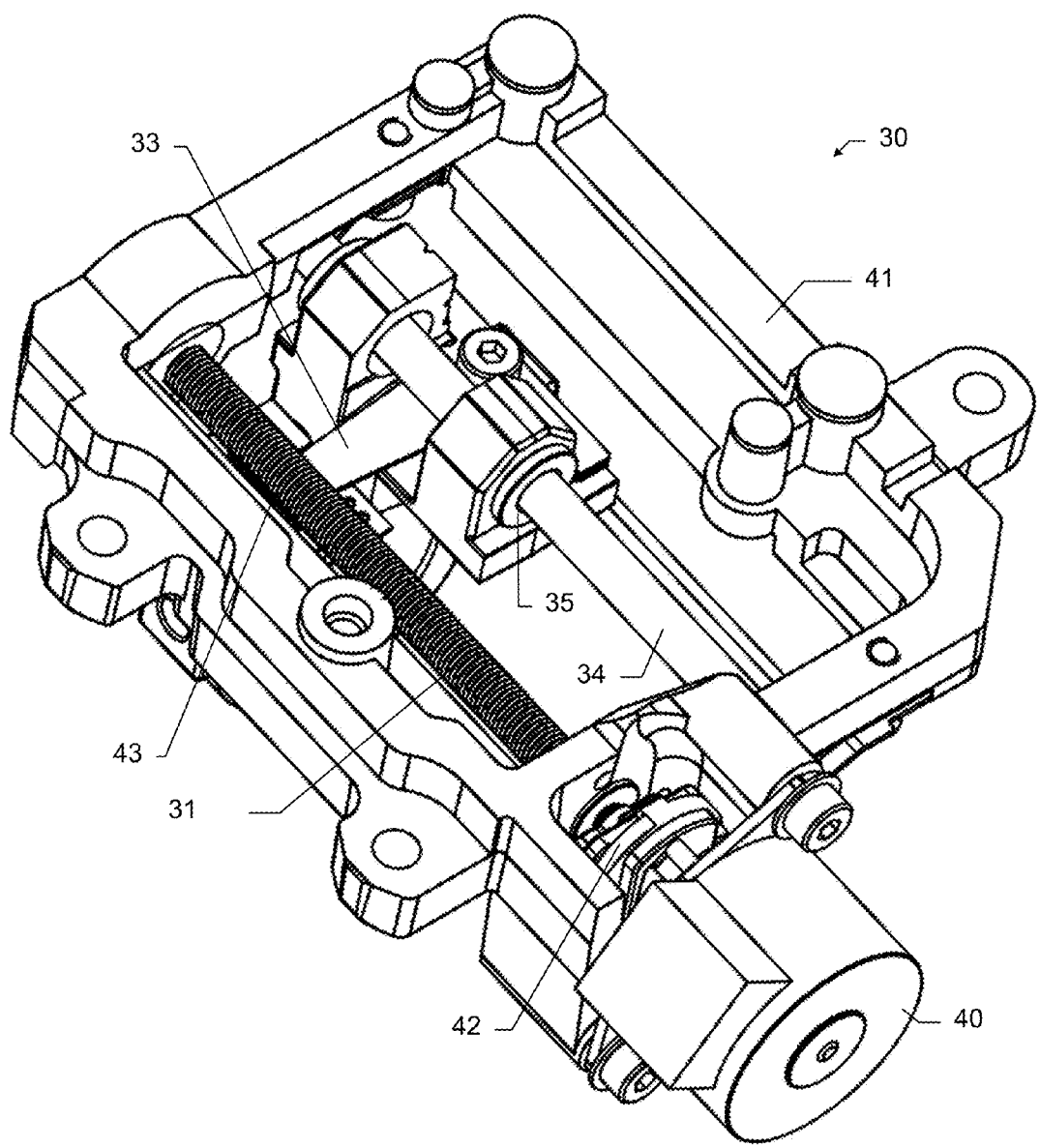
Figure 7C:
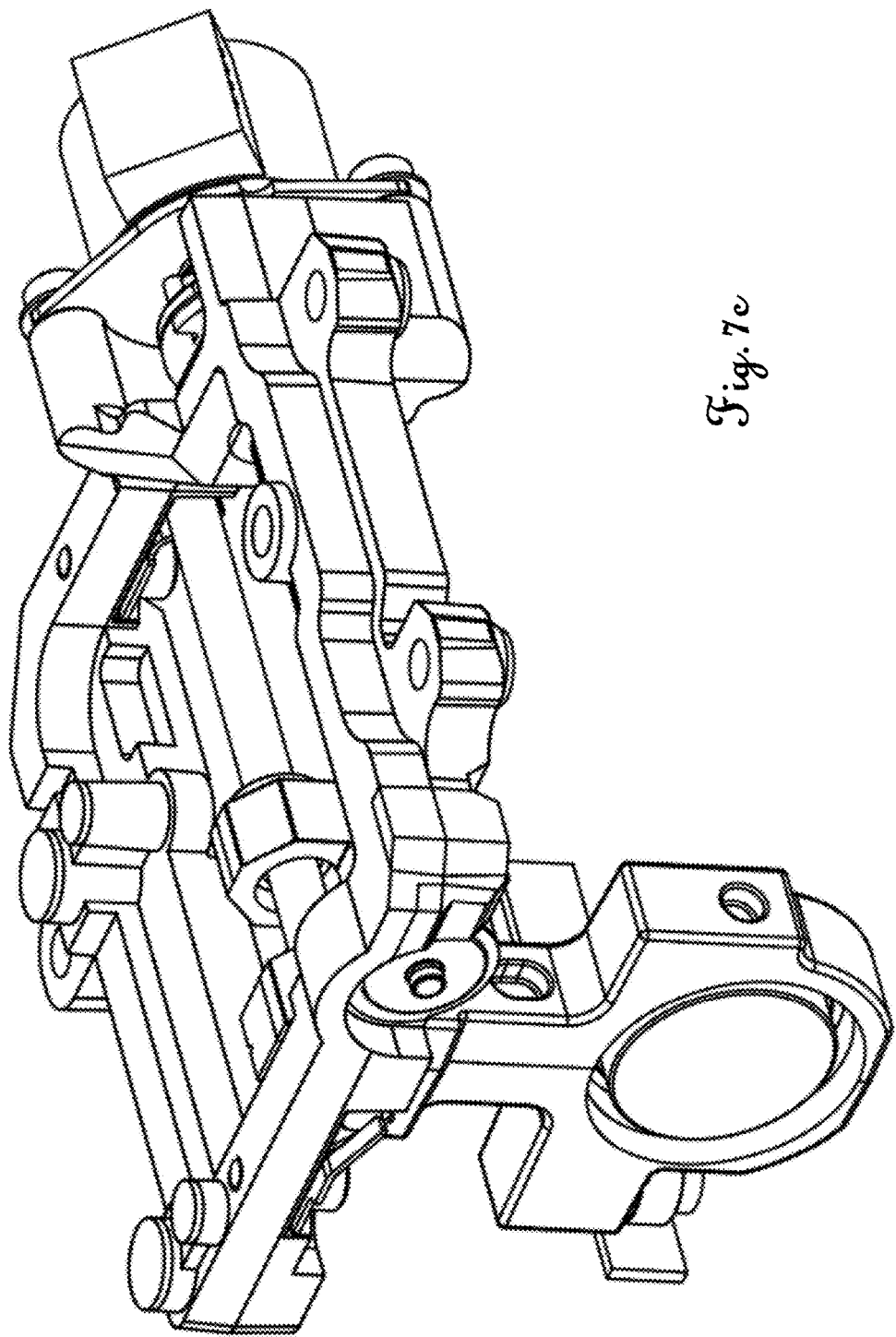
Figure 7D:
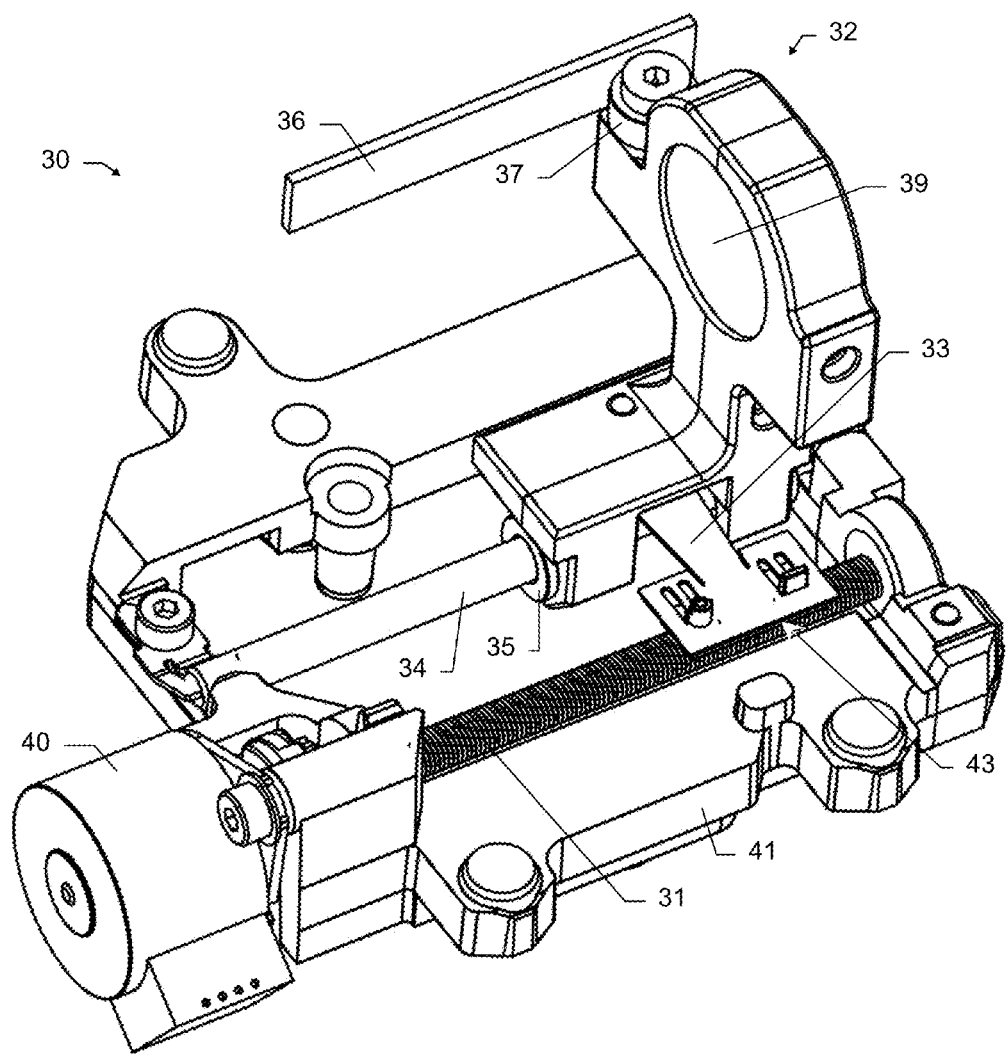
Figure 7E:
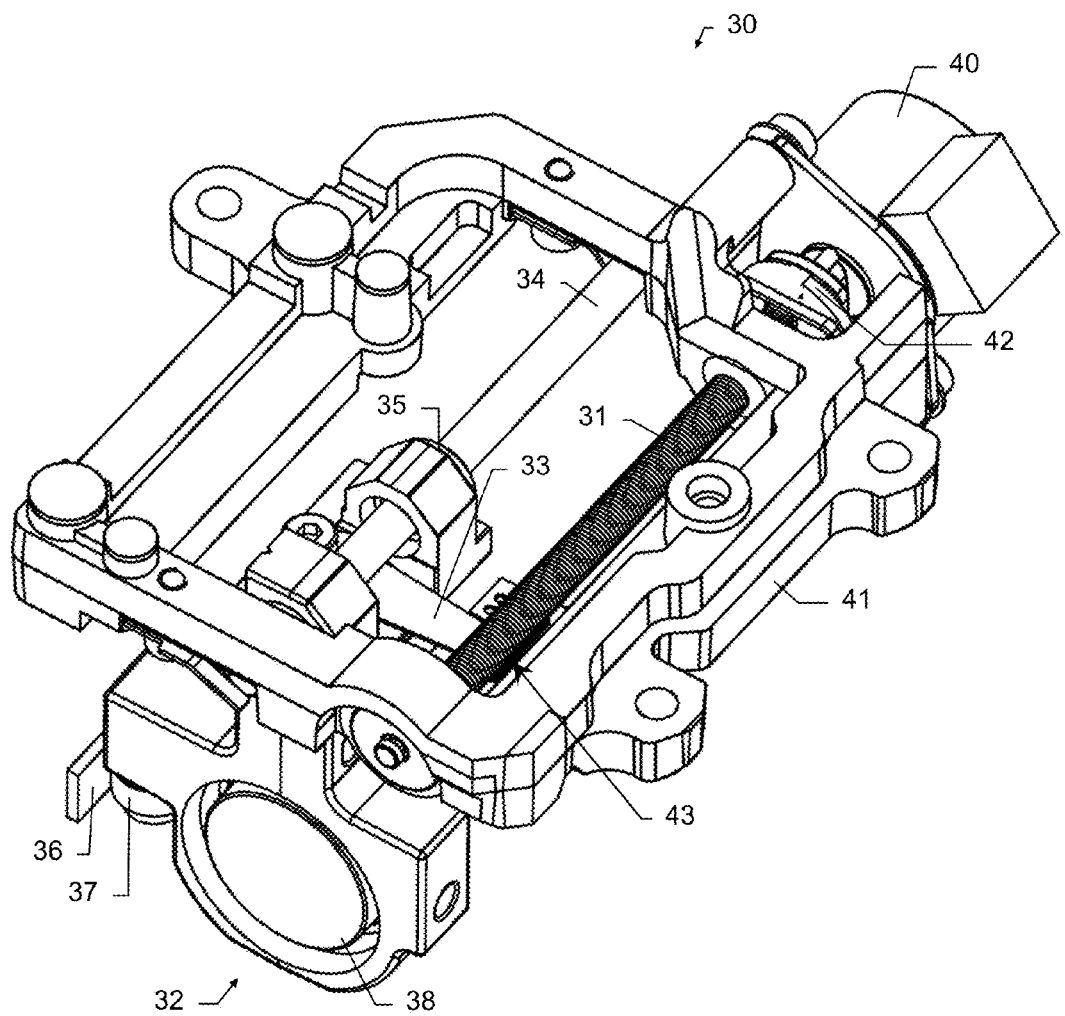

FIG. 6 shows a peripheral remote control unit, with its own additional display and its own additional evaluation and control unit, which is physically independent of the base station (likewise shown in the background). The same error, as described above, may also occur when sighting by means of the image, which is recorded by the camera integrated into the telescopic sight, transmitted to the remote control unit and displayed there, if the movable focusing optical unit experiences a radial deflection on its axial displacement path along an intended positioning axis.

Depicted from different perspectives, FIGS. 7a to 7e show an exemplary embodiment for a positioning apparatus 30 according to the invention for adjusting the focusing optical unit, which is designed e.g. for application in a telescopic sight of a geodetic surveying device for displacing the focusing member.

Here, the two main aspects according to the invention are unified in the embodiment depicted in an exemplary manner.

Here, the positioning apparatus 30 is embodied with a rotatably borne spindle 31 (in this case, specifically, a threaded spindle) which is coupled to a driveshaft of the motor 40 by a coupling 42 (embodied here in an exemplary manner as a claw coupling with an elastic intermediate disk).

The spindle counter segment 43, embodied as a comb-like structure, cooperates with the spindle 31 in such a way that—if there is a contact force acting relatively against one another between the spindle counter segment 43 and the spindle 31—the spindle counter segment 43 is displaced along the spindle 31 when the spindle 31 rotates (and therefore the sliding member 32 is displaced along the positioning axis).

With respect to the main body of the sliding member 32, the spindle counter segment 43 is flexibly borne by means of the clamping element 33 (embodied here as leaf spring) such that the spindle counter segment 43 can move relative to the main body with at least one degree of freedom. Here, the clamping element is fixedly connected to the main body at one end and fixedly connected to the spindle counter segment 43 at the other end.

A center point of the lens group 38 carried by the sliding member 32 is defined as principal point 39 which is predominantly to be displaced precisely along the positioning axis.

Furthermore, there is a first guide 34, defining a first guide axis extending parallel to the positioning axis, in the form of a guide rod for the sliding member. Here, the first guide and a first guide counter segment 35 of the sliding member (which for example respectively has V-bearing surfaces or U-bearing surfaces for the guide rod at two points or respectively has a bushing for the guide rod) are embodied, arranged relative to one another and cooperatively matched to one another in such a way that the sliding member 31 is guided along the first guide axis and a linear mobility along the first guide axis and a pivotability about the first guide axis remain for the sliding member 31.

Furthermore, provision is made for a second guide for the sliding member, comprising a second guide element 36 (in the form of a flat sliding surface) extending parallel to the positioning axis. Here, the second guide element and a second guide counter segment 37 of the sliding member (such as e.g. the roller shown here) are embodied, arranged relative to one another and cooperatively matched to one another in such a way that—if a contact force, against the second guide element 36, acting on the second guide counter segment 37 is present—the second guide counter segment is guided along the second guide element and the pivotability of the sliding member about the first guide axis is restricted. The second guide element therefore serves as stop for the pivotability of the sliding member, still granted by the first guide, and as a second guide at a second point (namely the second guide counter segment) of the sliding member. Furthermore, the second guide element, in cooperation with the second guide counter segment, is in this case embodied in such a way that the second guide counter segment is guided along the second guide element along a second longitudinal guide axis, extending parallel to the positioning axis, and (at least within a comparatively small region) along a second transverse guide axis, extending perpendicular thereto, such that the sliding member is therefore guaranteed a guided mobility along the second longitudinal guide axis over a certain range extending in the second transverse guide axis.

Here, the first and second guide, the motor and the spindle are carried by a framework, wherein, in this case, parts of a housing of the optical instrument (e.g. the housing of the targeting appliance of the surveying device) by all means can also contribute as part of the framework. Here, in the given case, the second guide element 36 of the second guide can e.g. be directly assembled on part of the housing of the telescopic sight and, moreover, the depicted frame 41 (which directly carries the first guide, the motor and the spindle) can likewise also be fixedly assembled on the housing of the telescopic sight such that the telescopic sight housing and the depicted frame 41 together form a framework for the components of the positioning apparatus.

In accordance with the first main aspect according to the invention, the clamping element 33 is now arranged in such a way that the latter is available in a pre-tensioned state when the sliding member is clamped—in respect of the pivotability thereof about the first guide axis, granted by the first guide—between the spindle 31 and the second guide element 36 with the spindle counter segment 43 thereof and the second guide counter segment 37 thereof and that a force is caused thereby such that, on the basis of the force caused by the clamping element in the pre-tensioned state, firstly, both the spindle counter segment 43 and the spindle 31 and, secondly, the second guide counter segment 37 and the second guide element 36 are respectively pressed against one another together with pivot anchoring of the sliding member caused by the first guide.

Hence, according to this first main aspect of the invention, the same clamping element 33, which ensures that the spindle counter segment and the spindle are pressed against one another and therefore kept in a state in which there is functional contact, is also used simultaneously with dual functionality (and using the first guide as pivot anchor) for the purpose of pressing the second guide counter segment and the second guide element against one another and therefore keeping these in a state in which there is functional contact.

Therefore, according to the invention, a less complex and less complicated design—in particular also relating to the required number of components of the positioning apparatus—is made possible.

According to the second main aspect according to the invention, the sliding member 32, with the first and second guide counter segment 35, 37 thereof, and the first and second guide 34, 36 are arranged relative to one another and matched to one another in such a way that—as observed in a cross-sectional plane aligned perpendicular to the positioning axis—
an x-direction, which points from the principal point of the sliding member to the intersection point of the second longitudinal guide axis of the second guide and the cross-sectional plane, and
a y-direction, which points from this principal point to the intersection point of the first guide axis and the cross-sectional plane,
include at least approximately a right angle, such that
the second guide is decisive for an x-travel—substantially uninfluenced by the first guide—of a track of the principal point actually traveled during the displacement of the sliding member, as observed in the x-direction, and
the first guide is decisive for a y-travel—substantially uninfluenced by the second guide—of said track of the principal point, as observed in the y-direction.

According to the invention, this can bring about a separation when adjusting the sliding member (or when positioning the first and second guide, which is relevant to positioning the sliding member) into separate adjustment steps/processes for, firstly, the positioning of the principal point of the sliding member once in the x-direction and, secondly, the positioning of the principal point of the sliding member in the y-direction.

Therefore, an adjustment process of the positioning apparatus within an optical instrument can advantageously be simplified.

Figure 8:
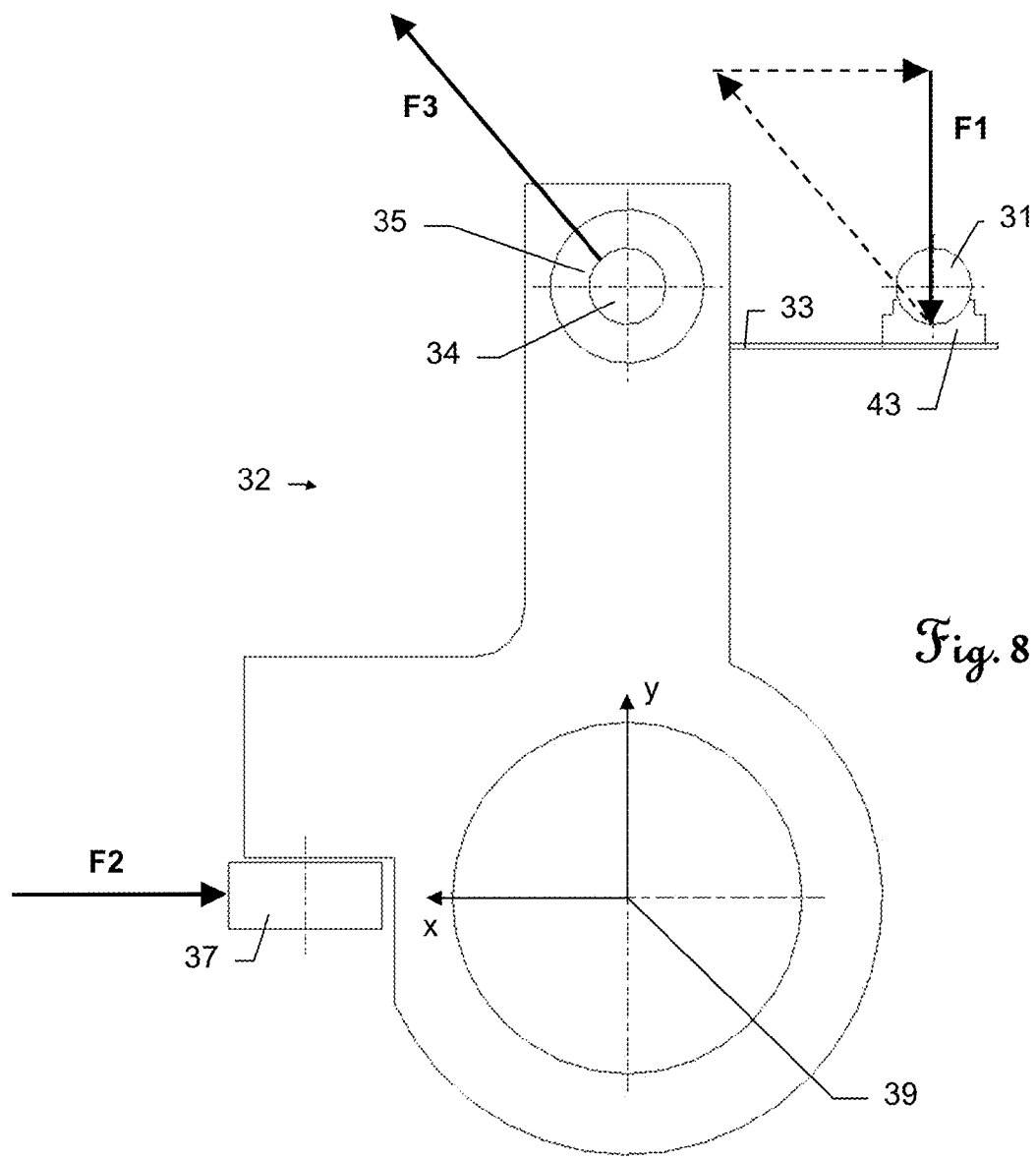
FIG. 8 shows a cross-sectional illustration through sliding member, first and second guide, and spindle of the embodiment of the invention depicted above in FIGS. 7a-7e.

FIG. 8 shows a cross-sectional illustration through sliding member, first and second guide, and spindle of the embodiment of the invention depicted above in FIGS. 7a-7e.

This figure illustrates, firstly, the acting forces—caused by the force brought about by the leaf spring, which is in the pre-tensioned state, in cooperation with clamping the sliding member with a comb-like structure 43 and roller 37 between the spindle 31 and sliding surface (not depicted here) and the pivot-anchoring in the guide rod 34.

As a result, the comb-like structure 43 now presses upward on the spindle 31 and (as a counteracting force, as depicted here as F1) the spindle 31 naturally also presses downward onto the comb-like structure 43. Furthermore, the roller 37 presses to the left onto the sliding surface and (as a counteracting force, as depicted here as F2) the sliding surface naturally also presses to the right onto the roller 37.

Furthermore, as a result of this, the first guide counter segment 35 presses obliquely downward right against the guide rod 34 and (as a counteracting force, as depicted here is F3) the guide rod 34 naturally also presses obliquely upward right against the first guide counter segment 35.

Thus, as a result of this, the mutual contact forces required for the cooperation of spindle with comb-like structure and roller with sliding surface are caused by the one pre-tensioned leaf spring.

In a further function of the leaf spring, the guide counter segment 35 and the guide rod 34 are simultaneously also mutually pressed against one another in a defined direction, which, in the case of a corresponding design of the guide counter segment 35, can be used for pre-tensioning the bearing of guide counter segment 35 and guide rod 34 relative to one another.

If guide counter segment 35 and guide rod 34 are embodied in such a way that a V-bearing is formed between guide counter segment 35 and the guide rod, the mutual contact force can be used for pre-tensioning the V-bearing (i.e. to be held in the "V").

Figure 10:
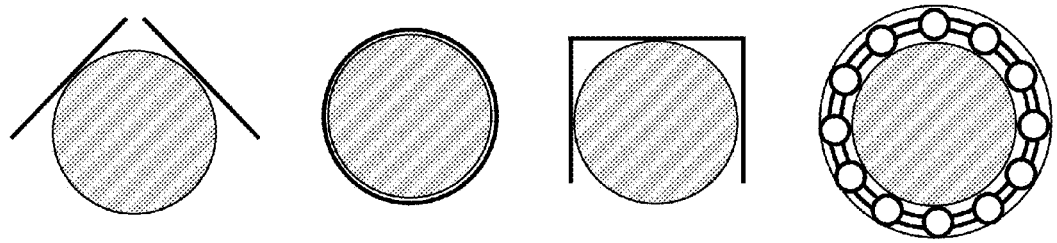
FIG. 10 shows examples of bearing a guide counter segment and a guide rod relative to one another according to some embodiments described herein.

Here, examples for bearing the guide counter segment 35 and the guide rod 34 relative to one another are illustrated and specified in an exemplary manner in FIG. 10. Thus, a first bearing which bears the guide rod and the first guide counter segment relative to one another can be embodied (as shown from left to right in FIG. 10) as V-bearing, sleeve bearing, U-bearing or ball bearing with a ball bearing retainer between a bushing of the first guide counter segment and the guide rod.

Figure 9:
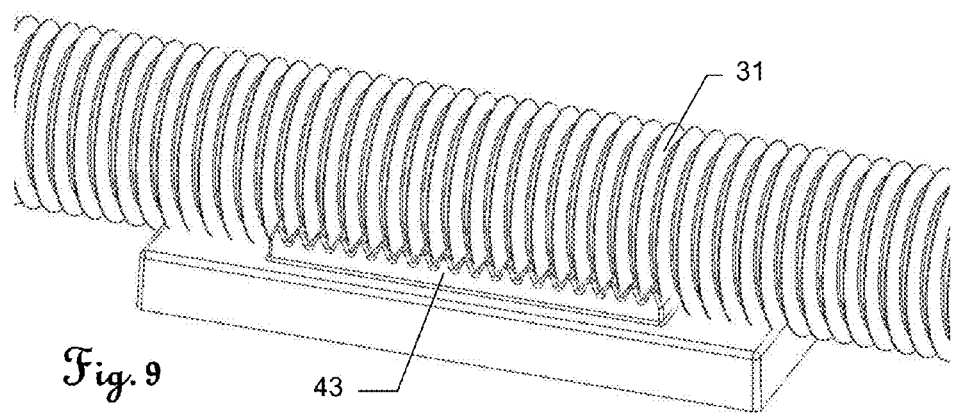
FIG. 9 shows a section of a spindle and a rake according to some embodiments described herein.

FIG. 9 shows a section of the spindle 31 and of the rake (or comb-like structure), embodied as a part made of plastic, which in this case acts as spindle counter segment 43, of the embodiment of the invention which is also shown in FIGS. 7a-7e.

Here, the rake is embodied with open, one sided spindle engagement and cooperates with the spindle and the clamping element in such a way that, in the clamped state of the sliding member (and hence in the pre-tensioned state of the leaf spring),
firstly, the rake and the spindle—due to the contact force—form an interlocking connection substantially without play and
secondly—as a result of flexibly bearing the rake relative to the sliding member main body—a freedom of movement for the rake is granted counter to the contact force for detaching the functional connection (so that the rake can be removed at least minimally in order to release (at least for a short time) the interlocking connection with the spindle (and then optionally also to reestablish this)).

This can now provide the positioning apparatus with improved protection against internal self damage e.g. despite an occurring malfunction of the motor. Thus, for example, in the case where the sliding member is already situated at a mechanical stop present for restricting the displacement path, and the spindle is nevertheless rotated further in the correspondingly wrong direction, the spindle counter segment can now be released against the contact force from the interlocking functional connection with the spindle and an irreversible mechanical defect on the spindle, the spindle counter segment, on the adjustment path stop and/or on the guides can be avoided.

As a result of the fact that the leaf spring has an elongate form and, with the longitudinal axis thereof, is aligned perpendicular to the spindle axis, moreover, a certain amount of flexibility in respect of a tiltability of the spindle counter segment with respect to the spindle is ensured.

For that reason, together with the uniform contact pressure caused by the leaf spring in any case, this then enables the rake, in the clamped state, nevertheless to be pressed uniformly on the spindle over the whole mutual contact region and, as a result of the contact force, the spindle counter segment to be brought and thus kept in an interlocking functional connection with substantially no play with the spindle, even in the case of inaccuracies—actually present in a relaxed state of the leaf spring in the positioning of rake in relation to spindle (e.g. slight tilt position with respect to one another).

It is understood that these depicted figures only schematically depict possible exemplary embodiments. The various approaches can be combined both with one another and with methods from the prior art.

The invention claimed is:

1. A positioning apparatus, comprising
a rotatable spindle,
a sliding member to be positioned along a positioning axis, wherein a spindle counter segment of the sliding member and the spindle are arranged relative to one another and cooperatively matched to one another in such a way that—if there is a contact force acting relatively between the spindle counter segment and the spindle against one another—the spindle counter segment is displaced along the spindle when the spindle rotates,
a first guide, defining a first guide axis extending parallel to the positioning axis, for the sliding member, wherein the first guide and a first guide counter segment of the sliding member are arranged relative to one another and cooperatively matched to one another in such a way that the sliding member is guided along the first guide axis and a linear mobility along the first guide axis and a pivotability about the first guide axis remain for the sliding member,
a second guide for the sliding member, comprising a second guide element extending parallel to the positioning axis, wherein the second guide element and a second guide counter segment of the sliding member are arranged relative to one another and cooperatively matched to one another in such a way that, if a contact force, against the second guide element, acting on the second guide counter segment is present, the second guide counter segment is guided along the second guide element and the pivotability of the sliding member about the first guide axis is restricted,
wherein:
a clamping element arranged in such a way and causing such a force that, thereby, the sliding member—in respect of the pivotability thereof about the first guide axis, granted by the first guide—is respectively clamped between the spindle and the second guide element with the spindle counter segment thereof and the second guide counter segment thereof such that, on the basis of the force caused by the clamping element,
firstly, both the spindle counter segment and the spindle and, secondly, the second guide counter segment and the second guide element are respectively pressed against one another together with anchoring of the sliding member caused by the first guide.

2. The positioning apparatus according to claim 1, wherein the clamping element comprises a spring element.

3. The positioning apparatus according to claim 1, wherein the spindle counter segment comprises one sided spindle engagement and cooperates with the spindle and the clamping element in such a way that, in the clamped state of the sliding member,
firstly, the spindle counter segment and the spindle—due to the contact force—form an interlocking connection substantially without play and
secondly—as a result of flexibly bearing the spindle counter segment or the spindle—a freedom of movement for the spindle counter segment or the spindle is granted counter to the contact force for detaching the functional connection.

4. The positioning apparatus according to claim 1, wherein
the spindle counter segment is flexibly borne relative to a main body of the sliding member by means of the clamping element and a spreading force acts on the spindle counter segment relative to the main body in the pre-tensioned state of the clamping element such that the clamped state of the sliding member, with the spindle counter segment thereof and the second guide counter segment thereof, is provided between the spindle and the second guide element.

5. The positioning apparatus according to claim 4, wherein
the clamping element is configured to be flexible in at least one degree of freedom in a plane perpendicular to the spindle axis and
rigid, at least in the direction of the positioning axis,
wherein the clamping element comprises a leaf spring, which with the flat sides thereof is arranged parallel to the spindle axis and positioning axis and, specifically, has an elongate form and, with the longitudinal axis thereof, is aligned perpendicular to the spindle axis.

6. The positioning apparatus according to claim 1, wherein there is a framework carrying the first and second guide, and also the spindle, wherein
the spindle is flexibly borne relative to the framework in a transverse direction perpendicular to the spindle axis and the clamping element arranged in such a way that, in the pre-tensioned state of the clamping element, a translational force acts on the spindle in this transverse direction such that this provides the clamped state of the sliding member, with the spindle counter segment thereof and the second guide counter segment thereof between the pressing spindle and the second guide element.

7. The positioning apparatus according to claim 1, wherein the spindle counter segment and the spindle are pressed against one another by means of the force caused by the clamping element, in a manner distributed substantially uniformly over all mutual contact regions.

8. The positioning apparatus according to claim 1, wherein, as a result of the first guide serving as anchor for the sliding member in the clamped state of the sliding member, a first bearing, bearing the first guide and the first guide counter segment relative to one another, is pre-tensioned by the force caused by the clamping element, wherein this presses the first guide counter segment into a defined position relative to the first guide.

9. The positioning apparatus according to claim 8, wherein the spindle comprises a threaded spindle and the spindle counter segment comprises a rake.

10. The positioning apparatus according to claim 8, wherein
a motor with a driveshaft,
a coupling for connecting the driveshaft to the spindle, wherein the coupling comprises a claw coupling with an elastic intermediate disk, and/or
a framework carrying at least the first and second guide, the motor and the spindle.

11. A positioning apparatus, comprising:
a rotatable spindle,
a sliding member to be positioned, for which a principal point to be displaced very precisely along a positioning axis is defined, wherein a spindle counter segment of the sliding member and the spindle are arranged relative to one another and cooperatively matched to one another in such a way that the spindle counter segment is displaced along the spindle when the spindle rotates,
a first guide, defining a first guide axis extending parallel to the positioning axis, for the sliding member, wherein the first guide and a first guide counter segment of the sliding member are arranged relative to one another and cooperatively matched to one another in such a way that the sliding member is guided along the first guide axis and a linear mobility along the first guide axis and a pivotability about the first guide axis remain for the sliding member,
a second guide for the sliding member, comprising a second guide element, wherein the second guide element and a second guide counter segment of the sliding member are arranged relative to one another and cooperatively matched to one another in such a way that the second guide counter segment is guided along the second guide element along a second longitudinal guide axis, extending parallel to the positioning axis, and along a second transverse guide axis, extending perpendicular thereto, and also the pivotability of the sliding member about the first guide axis is restricted,
wherein the sliding member, with the first and second guide counter segment thereof, and the first and second guide are arranged relative to one another and matched to one another in such a way that as observed in a cross-sectional plane aligned perpendicular to the positioning axis an x-direction, which points from the principal point to the intersection point of the second longitudinal guide axis and the cross-sectional plane, and a y-direction, which points from the principal point to the intersection point of the first guide axis and the cross-sectional plane, include an angle of between 60 and 120 degrees, such that the second guide is decisive for an x-travel—substantially uninfluenced by the first guide of a track of the principal point actually traveled during the displacement of the sliding member, as observed in the x-direction, and the first guide is decisive for a y-travel—substantially uninfluenced by the second guide of the track of the principal point, as observed in the y-direction.

12. The positioning apparatus according to claim 11, wherein the angle of between 60 and 120 degrees comprises at least approximately a right angle.

13. The positioning apparatus according to claim 11, wherein:
the first guide has a first guide element, and a first bearing, bearing the first guide element and the first guide counter segment relative to one another, comprising a plain bearing.

14. The positioning apparatus according to claim 13, wherein the first guide element comprises a guide rod.

15. The positioning apparatus according to claim 13, wherein the plain bearing comprises a V or U-bearing with sliding surfaces or sliding edges, made of bronze or sliding-optimized plastic, arranged on the first guide counter segment.

16. The positioning apparatus according to claim 13, wherein the plain bearing comprises sleeve bearing with a round bushing made of bronze or sliding-optimized plastic, arranged on the first guide counter segment.

17. The positioning apparatus according to claim 13, wherein the plain bearing comprises a ball bearing with two axes.

18. The positioning apparatus according to claim 13, wherein the plain bearing comprises a rolling-element bearing with two axes.

19. The positioning apparatus according to claim 11, wherein
   the second guide element comprises a flat sliding surface having a ceramic or a rod, wherein a longitudinal axis of the flat sliding surface is aligned parallel to the positioning axis such that the second longitudinal guide axis is defined thereby, and a transverse axis of the flat sliding surface is aligned in the y-direction such that the second transverse guide axis is defined thereby, and
   the second guide counter segment comprises an apparatus selected form the group consisting of a roller, a ball bearing, one or more pin elements as sliding element, one or more ball elements as sliding element, and a surface, specifically made of sliding-optimized plastic, as sliding element.

20. An optical instrument with a positioning apparatus according to any one of the preceding claims, wherein the sliding member carries a focusing optical unit comprising a focus lens system or a focus lens, such that a principal point of the focusing optical unit can be displaced along an intended optical axis of the optical instrument as positioning axis and a focus can thereby be set,
   specifically wherein the optical instrument comprises a telescope for use in a geodetic surveying device.

* * * * *